May 15, 1928.

F. L. BORCHERT

DISPLAY DEVICE FOR ADVERTISING FRUIT JUICES

Filed Feb. 24, 1925

Inventor:
F. L. Borchert
By Wilson & McKenna
Attys.

May 15, 1928.

F. L. BORCHERT 1,669,444

DISPLAY DEVICE FOR ADVERTISING FRUIT JUICES

Filed Feb. 24, 1925

Inventor:
Fred L. Borchert
By Wilson & McCann
Attys.

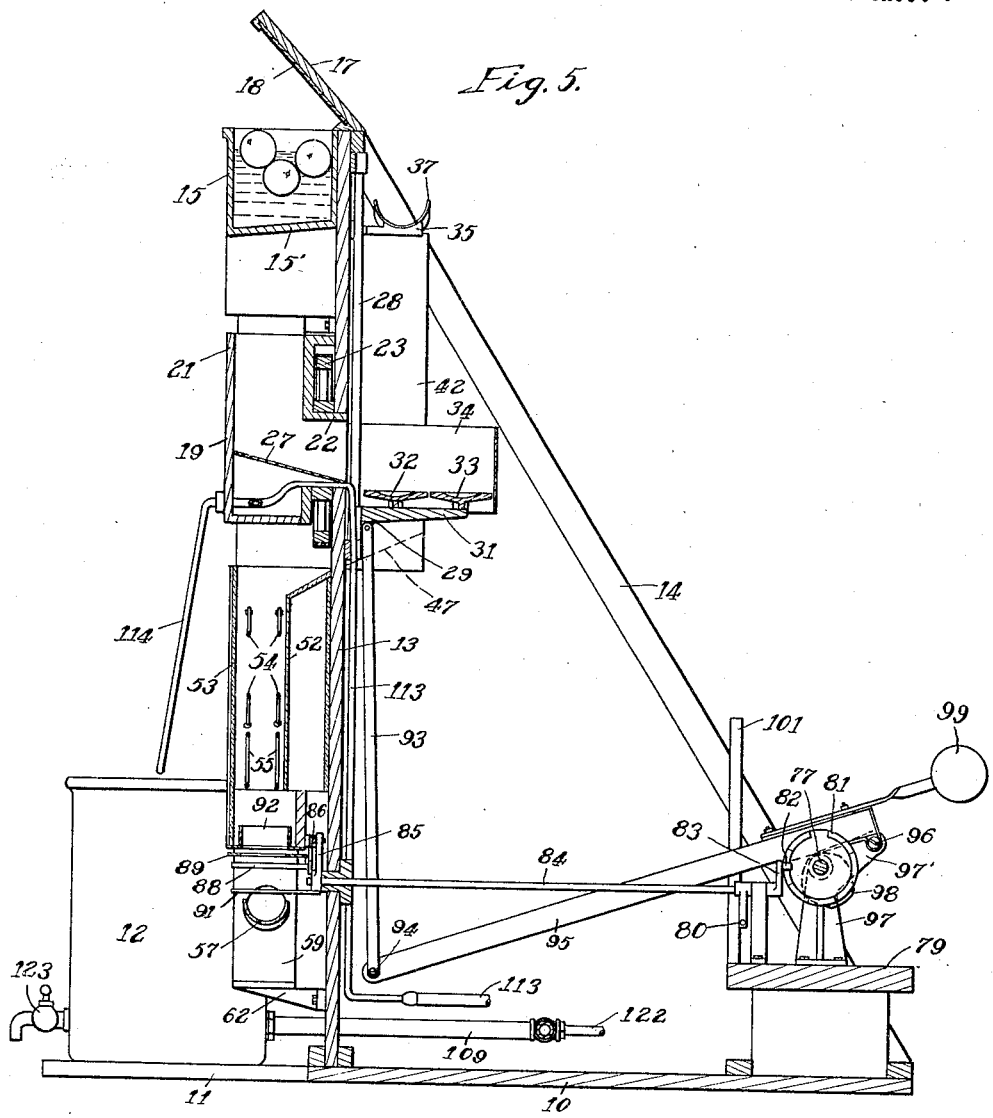

Patented May 15, 1928.

1,669,444

UNITED STATES PATENT OFFICE.

FRED L. BORCHERT, OF ROCKFORD, ILLINOIS.

DISPLAY DEVICE FOR ADVERTISING FRUIT JUICES.

Application filed February 24, 1925. Serial No. 11,075.

This invention relates to a class of advertising devices at present used to some extent to promote the sale of soft drinks made from fruit juices, such as orangeade and the like, by presenting to the view of customers and patrons at the stand where such drinks are dispensed an apparatus simulating the fruit employed in the beverage and the grinding or crushing and expressing of the juice therefrom; such apparatus in some cases including a fountain front and one or more faucets from which the real beverage is dispensed.

One object of the present invention is to provide an improved display apparatus of the type above-referred to designed to favorably attract the attention of patrons and passers-by and thus stimulate trade. Another object is to provide, in such an apparatus, improved means for simulating the fruit used, such as oranges, the grinding or crushing of the same, and the flow of an artificial liquid colored to simulate the genuine fruit juice, into fountain containers or tanks, the latter carrying faucets connected to supply pipes for the genuine fruit juice.

Other more specific objects and advantages of the invention will be apparent to persons familiar with advertising devices of this character from the following detailed description taken in connection with the accompanying drawings in which I have illustrated one practical and efficient embodiment of the invention, and wherein—

Fig. 5 is a full length vertical section on the line 5—5 of Fig. 3.

Figure 1:
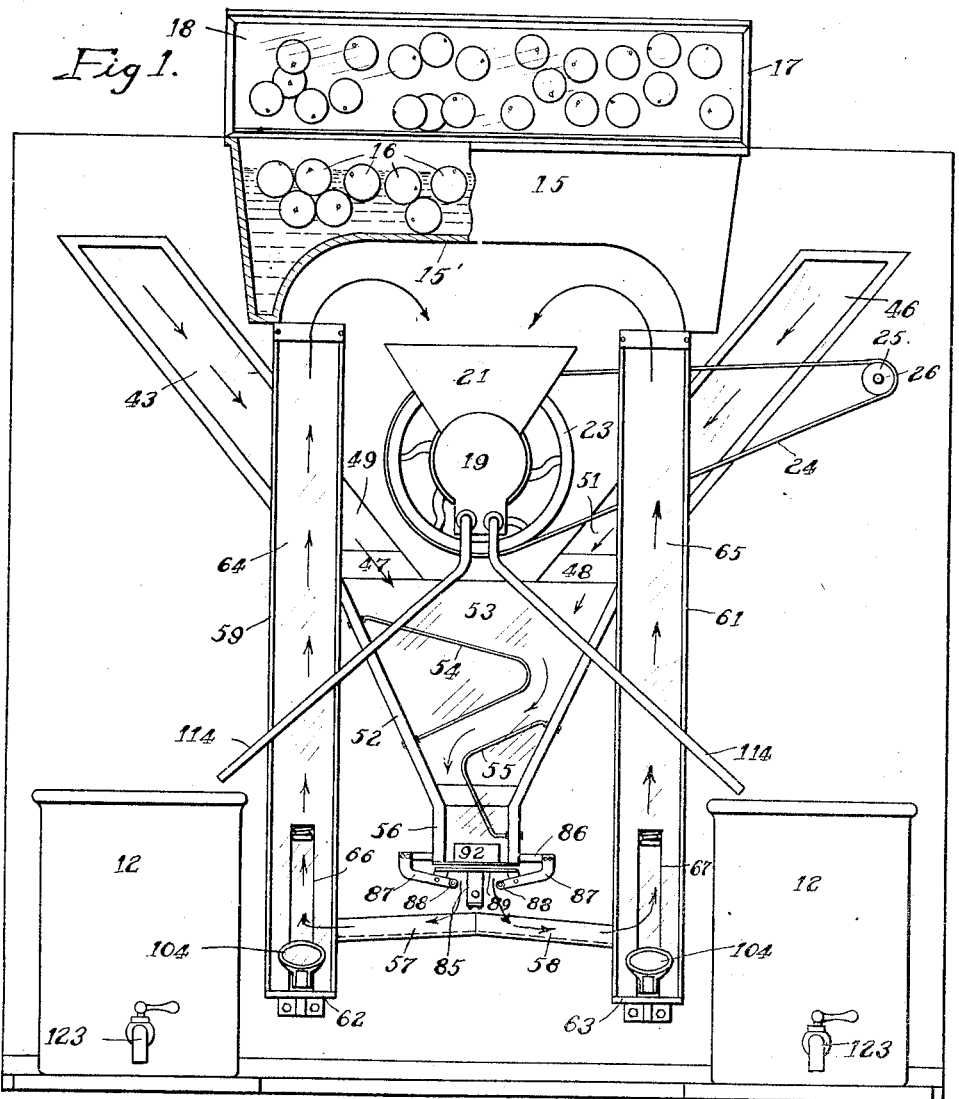
Fig. 1 is a front elevation of the apparatus.

Referring to the drawings, 10 designates a base-plate formed with a pair of forwardly projecting shelves 11 on its front edge which support tanks or bowls 12 designed to contain the artificial or juice simulating liquid. On and parallel with the front edge of the base-plate 10 is mounted a vertical plate 13 strongly supported at its upper end from the base-plate 10 by oblique braces 14. Secured to the front of the vertical plate 13 centrally of its upper portion is a tank 15 adapted to contain a body of water in which are floating a number of light balls 16, in the instance shown made and colored to simulate oranges. This tank 15 is provided with a lid or cover 17 containing a mirror 18 on its under side so that, when the cover is placed at a 45° inclination, the images of the simulated fruit floating in the water appear to and attract the eye of an observer. It will be noted that the bottom 15' of the tank 15 is arched, as shown in Fig. 1, for a purpose hereinafter disclosed, and preferably also the bottom 15', as shown in Fig. 5 is slightly inclined transversely upwardly toward the supporting plate 13.

Figure 2:
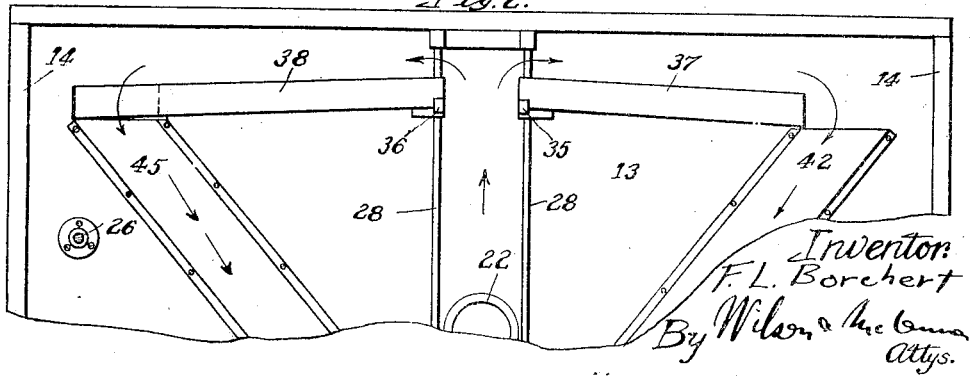
Fig. 2 is a rear elevation of the upper portion, omitting the reflecting lid or cover of the upper tank.
Figure 3:
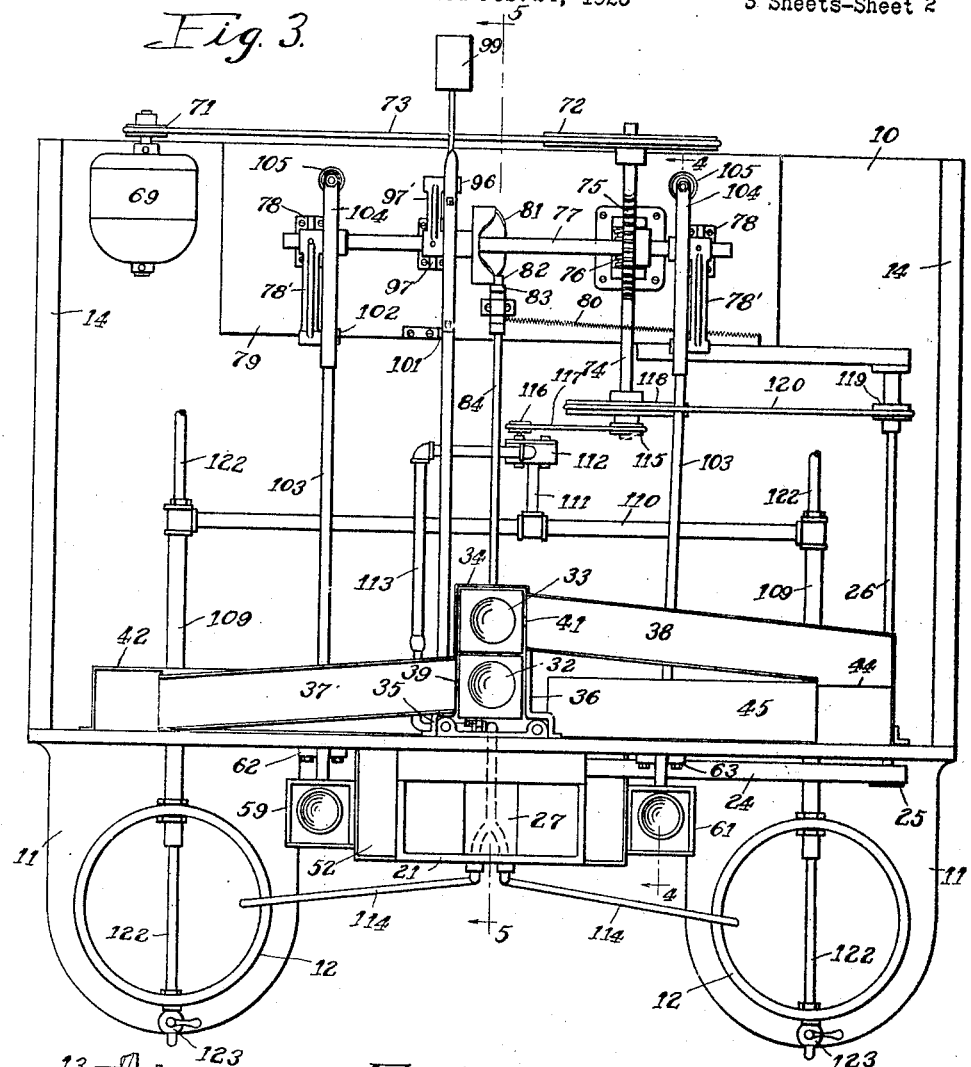
Fig. 3 is a top plan view, with the upper tank omitted.

Centrally below the tank 15 there is mounted in the supporting plate 13 a hollow casting made in imitation of the body 19 and hopper 21 of a grinding mill, and on the tubular shank or stem 22 of this casting behind the hopper 21 is journaled a pulley 23 that is rotated by a belt 24 from a small pulley 25 on a shaft 26 (Fig. 3). In the hopper body 19 is located a downwardly and rearwardly inclined plate 27 (Fig. 5) to guide the imitation fruit falling through the hopper and into the body of the mill out through the hollow stem or shank 22. On the rear of the upper portion of the plate 13 are mounted a pair of parallel guide bars or rods 28, clearly shown in Fig. 2, forming a vertical slideway for an angle bracket 29, on the horizontal rearwardly extending shelf 31 of which are pivotally mounted, with capacity of tipping or tilting transversely, a pair of shallow cups 32 and 33. In the lowered position of the bracket and cups shown in Fig. 5, the cups are surrounded by a rectangular sheet-metal wall 34, the purpose of which will hereinafter appear.

Supported on rearwardly projecting horizontal brackets 35 and 36 on the plate 13 are the upper inner ends of a pair of oppositely extending downwardly inclined chutes 37 and 38, the chute 38 being rearwardly offset relatively to the chute 37, as clearly shown in the plan view, Fig. 3. The inner end of the chute 37 registers with the cup 32 when the latter is fully raised, and the inner end of the chute 38 registers with the cup 33 when the latter is fully raised. The cups 32 and 33 are formed with small lugs 39 and 41 respectively (Fig. 3) that, when the cups are fully raised, strike the bracket arms 35 and 36 and cause the plates to tilt sidewise so as to discharge the imitation fruit from the cups into the upper ends of the chutes 37 and 38.

The lower end of the chute 37 registers with the upper end of a downwardly and inwardly inclined chute 42 mounted on the rear of the plate 13 over a slot that is provided with a glass cover or front 43. Similarly the lower end of the chute 38 registers through a lateral opening 44 (Fig. 3) with the upper end of a similar downwardly and inwardly inclined chute 45 on the rear side of the plate 13, this latter chute also having a glass front or cover 46.

Figure 4:
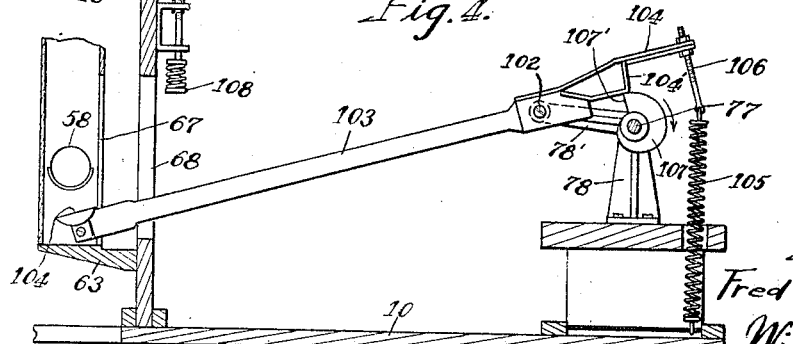
Fig. 4 is a vertical section on the line 4—4 of Fig. 3.

The bottoms of the chutes 42 and 45 are formed with downwardly and forwardly inclined bottom walls 47 and 48 (Fig. 1) over which the imitation fruit rolls through openings 49 and 51 in the plate 13 into the upper end of a hopper 52 mounted on the front of the plate 13 directly below the mill. This hopper is provided with a glass font 53, and in the sides of the hopper are mounted wires 54 and 55 so bent as to form a zig-zag path of travel for the imitation fruit through the hopper and into the neck 56 of the latter. On the bottom of the neck 56 is a positively actuated valve mechanism by which the imitation fruit units are alternately delivered onto the inner ends of a pair of downwardly and outwardly inclined chutes 57 and 58. This valve mechanism will be hereinafter described in connection with the actuating mechanism that effects the upward movements of the imitation fruit. The lower ends of the chutes 57 and 58 communicate laterally, as best shown in Fig. 4, with the lower end portions of a pair of parallel vertical chutes 59 and 61 that are supported by brackets 62 and 63 on the front of the plate 13 being symmetrically disposed on opposite sides of the central vertical front and rear plane of the apparatus. These chutes 59 and 61 are equipped with glass fronts 64 and 65 respectively, and are slotted in rear at their lower ends, as shown at 66 and 67 in Fig. 1. The plate 13 is also formed with registering slots 68, one of which appears in Fig. 4.

By reference to Fig. 1 it will be seen that the open upper ends of the chutes 59 and 61 lie directly beneath the end portions of the arched bottom 15′ of the tank 15. The curved portion of this arched bottom directly overlying the upper ends of the chutes serve as guides to deflect the imitation fruit thrown upwardly through the chutes (by mechanism hereinafter described) into the mill hopper 21.

The circulatory path of travel of the imitation fruit has been indicated in the foregoing and may be connectedly described as follows. Assuming that a pair of fruit units are on the inclined bottom 27 of the mill, they roll down the latter and come to rest in the cups 32 and 33, being confined by the wall 34. These cups are then raised and tilt the units into the upper ends of the chutes 37 and 38, down which latter they roll into the upper ends of the chutes 42 and 45. From the bottom of the latter they fall into the hopper 52, down which they roll in a zig-zag course and fall alternately into the upper ends of the chutes 57 and 58. Rolling down the latter they fall into the lower ends of the vertical front chutes 59 and 61 and are impelled upwardly through the latter by mechanism hereinafter described and, striking and being deflected from the bottom wall 15′ of the tank 15 they drop into the mill hopper 21 and thus reach the starting point. It may here be noted that the upward and rearward transverse inclination of the bottom plate 15′ shown in Fig. 5 insures against the units being deflected outwardly over the front of the hopper 21.

Describing next the valve mechanism on the discharge mouth of the hopper 52. 69 designates an electric motor mounted on the base-plate 10 which, through pulleys 71, 72 and a belt 73 drives a shaft 74, this latter having a worm 75 driving a worm wheel 76 on a cross shaft 77 journaled in bearing brackets 78 on a low platform 79 mounted on the base-plate 10. Fast on the shaft 77 is an annular cam 81, the face of which engages with a pin 82 (Fig. 5) in a crank-arm 83 on a front and rear shaft 84, the forward end of the latter shaft being journaled in the vertical supporting plate 13. A pull spring 80 (Figs. 3 and 5) holds the pin engaged with the face of the cam. On the forward end of shaft 84 is a vertical rock-arm 85 which is mounted on the shaft 84 slightly above its lower end. To the upper end of the arm 85 is secured a horizontal strip 86 (Fig. 1) carrying on its opposite ends downwardly and inwardly projecting arms 87, these latter carrying at their lower ends forwardly projecting pins 88 (Fig. 5). These arms 87 also support between them a thin annulus 89 of sufficient internal diameter to permit the imitation fruit unit to fall therethrough and temporarily come to rest on a central forwardly projecting strip 91 secured to the lower end of the rock-arm 85. Just above the annulus 89 and within the neck 56 of the hopper 52 is preferably mounted an upper guiding annulus 92. As the shaft 84 is rocked by its cam, the arm 85 is correspondingly tilted back and forth, and the pins 88 alternately strike a fruit unit coming to rest on the strip 91 and push it down onto the chutes 57 and 58, a sufficient opening being provided by reason of the fact that the fruit supporting strip 91 and the thrust pin co-operating therewith move simultaneously in opposite directions, thereby creating a sufficiently wide opening between the strip 91 and the other pin 88 to allow the unit to pass therebetween.

Describing next the means for elevating the shelf 31 and the cups 32 and 33 carried thereby, this is shown mainly in Fig. 5, and comprises the following instrumentalities. Pivoted to and depending from the shelf bracket 29 is a thrust link 93, the lower end of which is pivoted at 94 to the forward end of a lever 95. This lever is fulcrumed at its rear end at 96 to an arm 97' on a bearing bracket 97 forming one of the bearing supports for the shaft 77, and rides on a cam 98 fast on said shaft; said cam liftingly engaging said lever 95 a short distance in front of its fulcrum. A counterweight 99 rearwardly overhanging the fulcrum of the lever assists the lifting movement and steadies the lowering movement of the lever; and a vertical guide stip 101 opposes side play of the lever.

The imitation fruit units are thrown upwardly in the vertical chutes 59 and 61 by a spring-actuated tossing mechanism, the details of which are shown mainly in Fig. 4. Pivoted at 102 to an arm 78' on one of the bearing brackets 78 of the shaft 77 is a tossing lever, the long arm 103 of which extends through the slots 68 and 67 into the chute and carries on its inner end a cup 104 onto which the unit falls from one of the gravity chutes 57 and 58. The short arm 104 of this lever is attached to a pull spring 105 by means of an eye-bolt 106 by which the tension of the spring can be adjusted; the spring being anchored at its lower end to the base-plate 10. A downwardly extending portion 104' on the under side of the lever arm 104 rides on the periphery of a spiral cam 107 fast on shaft 77; said cam having an abrupt radial drop 107'. As the portion 104' rides off the peak of the cam, the spring 105 throws the long arm 103 upwardly, tossing the unit upwardly through and out of the upper end of the chute, as already described. The quick up stroke of the lever arm 103 is checked by a spring buffer 108; and the succeding revolution of the cam lowers the arm 103 to the position shown in Fig. 4.

The circulation of a fluid colored to imitate the genuine fruit juice is effected as follows. From the rear of the tanks 12 near their bottoms extend pipes 109 (Fig. 3) that are connected by a cross pipe 110 from which a pipe 111 leads into the intake side of a rotary pump 112. From the discharge of said pump a pipe 113 leads forwardly and upwardly into the bottom of the mill body 19 where it is forked; the two branches 114 leading out through the front of the mill body and thence down to points slightly above the tops of the tanks 12. The pump 112 is driven by pulleys 115, 116 and a belt 117 from shaft 74, and the shaft 26 is also driven from shaft 74 by pulleys 118, 119 and a belt 121.

Where the device is used to constitute a fountain front, service pipes 122 for the genuine fruit juice may lead from a source of supply and directly through the bottoms of the tanks 12, terminating in faucets 123. These pipes 122 are conveniently carried through the circulation pipes 109, as clearly shown in Fig. 3.

I have herein shown and described one practical mechanical embodiment of the invention, the specific details of which may manifestly be considerably varied without departing from the invention or sacrificing any of the advantages inherent therein. Hence, I do not limit the invention to the precise details of structure and arrangement shown for purposes of illustration, but reserve all such variations and modifications as fall within the spirit and purview of the appended claims.

I claim—

1. In a display device of the character described the combination of an apertured vertical supporting plate, a mill casing and hopper mounted on the front of said plate, means for guiding the gravity flow of artificial fruit units through said hopper and casing and the aperture of said plate, a lifting device for said units on the back of said plate, a down-flow chute having a transparent front wall on said plate, means for transferring the units from said lifting device to the upper end of said chute, and tossing mechanism for transferring the units from the bottom of said chute back into said hopper.

2. In a display device of the character described, the combination of an apertured vertical supporting plate, a mill casing and hopper mounted on the front of said plate, means for guiding the flow of artificial fruit units through said hopper and casing and the aperture of said plate, a lifting device for said units on the back of said plate, a down-flow chute having a transparent front wall on said plate, means for transferring the units from said lifting device to the upper end of said down-flow chute, an up-flow chute having a transparent front wall on said plate, means for transferring the units from the bottom of said down-flow chute to the bottom of said up-flow chute, tossing mechanism for elevating the units through said up-flow chute, and means for guiding the units thence into said hopper.

3. In a display device of the character described, the combination of an apertured vertical supporting plate, a mill casing and hopper mounted on the front of said plate, means for guiding the flow of artificial fruit units through said hopper and casing and the aperture of said plate, a lifting device for said units on the back of said plate, a pair of downwardly and inwardly inclined down-flow chutes having transparent front walls on said plate, laterally extending downwardly inclined chutes serving to conduct the units from said lifting device to the upper ends of said down-flow chutes, a second hopper mounted on said plate below said mill casing with which the lower ends of said down-flow chutes communicate and provided with a transparent front wall, a pair of vertical up-flow chutes on the front of said plate, laterally extending downwardly inclined chutes serving to conduct the units from the bottom of said second hopper to the bottoms of said up-flow chutes, a valve mechanism on said second hopper operating to direct the units alternately to aid last-named laterally extending chutes, means for elevating the units through said up-flow chutes, and means for guiding the units thence into said mill hopper.

4. In the display device of the character described, the combination of an apertured vertical supporting plate, a mill hopper and body mounted on the front of said plate and opening to the rear of said plate through the aperture thereof, and means for effecting a circulatory flow of artificial fruit units through said mill hopper and body partly visible from the front of said plate, said means including a shelf mounted to slide vertically on the back of said plate between the aperture of the latter and a point above said hopper, a tiltable cup on said shelf to hold the fruit units and discharge by tilting, and power-driven means for raising and lowering said shelf.

5. A mechanism as recited in claim 4, wherein the means for raising and lowering the shelf comprises a pivoted lever, a thrust link connecting said lever and shelf, and a cam operating on the lower side of said lever to raise the latter.

6. In a display device of the character described, the combination of a vertical supporting plate, a mill hopper and body mounted on the front of said plate, and means for effecting a circulatory flow of artificial fruit units through said mill hopper and body partly visible from the front of said plate, said means including a vertical chute on the front of said plate having a transparent front wall, power operated means for throwing the fruit units upwardly through said chute, and means for guiding said units from the top of said chute into said hopper.

7. A mechanism as recited in claim 6, wherein the means for elevating the units through the chute consist of a spring-actuated striker projecting into the chute and operating to toss the units upwardly through the latter, and a power-driven cam for tensioning the striker actuating spring.

8. A display device of the character described having a vertical supporting plate, a hopper having a transparent front wall mounted on the front of said plate and forming an element of a system for circulating artificial fruit units, a pair of oppositely extending chutes underlying the discharge throat of said hopper and constituting elements of said circulatory system, an oscillatory valve mechanism controlling the discharge throat of said hopper and operating to discharge said units alternately into said chutes, and power operated means for actuating said valve mechanism.

9. A mechanism as recited in claim 8, wherein said valve actuating mechanism comprises a rock-shaft, and a continuously rotating cam oscillating said rock-shaft.

10. A display advertising device for soft drink stands having a vertical supporting plate, an imitation grinding mill mounted on the front of said plate in substantially the transverse center of the latter, vertical chutes on either side of said mill, means for impelling imitation fruit units upwardly through said chutes, and an arched plate overhanging the upper ends of said chutes and the top of said mill and serving to deflect said units from said chutes into said mill.

11. A display device of the character described having an apertured vertical supporting plate, a mill hopper and body mounted on the front of said plate and opening to the rear of said plate through the aperture thereof, and means for effecting a circulatory flow of artificial fruit units through said mill hopper and body partly visible from the front of said plate, said means including a shelf mounted to slide vertically on the back of said plate between the aperture of the latter and a point above said hopper, a tiltable cup on said shelf to hold the fruit units and discharge by tilting, power driven means for raising and lowering said shelf comprising a pivoted lever, a thrust link connecting said lever and shelf, and a cam operating on the lever to raise the latter, said cam engaging the lever between its fulcrum and its connection to said thrust link, and said lever being provided with a counterweight overhanging its fulcrum to aid the cam in the lever-lifting movement.

12. In a display device of the character described, the combination of a vertical supporting plate, a mill hopper and body mounted on the front of said plate, and means for effecting a circulatory flow of artificial fruit units through said mill hopper and body partly visible from the front of said plate, said means including a vertical chute on the front of said plate having a transparent front wall, power operated means for throwing the fruit units upwardly through said chute, means for guiding said units from the top of said chute into said hopper, said throwing means comprising a spring-actuated striker projecting into the chute and operating to toss the units upwardly through the latter, and a power-driven cam for tensioning the striker actuating spring, said striker being in the form of a lever having its longitudinal arm projecting into the chute and its shorter arm connected to a pull spring and liftingly engaged by a rotating spiral cam with an abrupt drop, said cam acting to lower the longitudinal arm of the lever and simultaneously tension said pull spring.

FRED L. BORCHERT.